United States Patent Office 3,502,506
Patented Mar. 24, 1970

3,502,506
ELECTROCHEMICAL CELL WITH TUNGSTEN BRONZE CATALYST ON ANODE
Barret Broyde, New York, N.Y., assignor to Esso Research and Engineering Company, a corporation of Delaware
No Drawing. Filed Dec. 29, 1966, Ser. No. 605,596
Int. Cl. H01m 27/04, 13/06
U.S. Cl. 136—86          4 Claims The present invention concerns non-noble metal electrocatalysts. In general, it relates to non-noble metal anodic oxidation catalysts for use in electrochemical cells. In particular, it concerns novel transition and post-transition metal mixed-oxide tungsten bronzes, the method of preparing said bronzes, and the use of said bronzes as catalysts for the anodic oxidation of a fuel in a fuel cell.

As used herein, the term "electrochemical cells" refers both to fuel cells and electrolytic cells.

The term "fuel cell" is used herein and in the art to denote a device, system or apparatus wherein the chemical energy of a fluid (i.e. gaseous or liquid) combustible fuel, e.g. hydrogen, carbon monoxide, a hydrocarbon or a substituted hydrocarbon containing hydrogen in its molecular structure, is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into contact with the anode and electrolyte and means for admitting a fluid oxidant into dual contact with the cathode and electrolyte. When necessary or desired, the electrolyte compartment is divided into an anolyte compartment and a catholyte compartment, e.g. by an ion-permeable partition or ion-exchange membrane. Thus, in each such fuel cell, a fluid fuel is passed to the anode and there oxidized electrochemically, giving up electrons to the anode, while a fluid oxidant is passed to the cathode and there reduced upon receiving electrons from such cathode. Since the voltage developed by an individual cell is low, it is usually preferable to employ relatively small cells and to electrically connect large numbers of such cells in series or in both series and parallel.

The term "electrolytic cell" is used herein and in the art to denote a device, system or apparatus which unlike the aforementioned fuel cell does not provide a net production of electrical energy but does provide for the anodic oxidation of an organic fuel at the anode of the cell. In such cells a direct current of electrical energy from an external source, e.g., a fuel cell, a storage battery or an alternating current rectifier, is admitted to the electrical circuit to provide an electron supply to the cathode. These cells evolve hydrogen from an aqueous electrolyte and water is added to the electrolyte while the cell is in operation. Such cells can be used for electrochemical production of various organic chemicals, e.g., conversion of alcohols to ketones, hydrocarbons to carboxylic acids, etc.

In most of the cells of the type hereinbefore described, catalysts are employed to promote the reactions within the cell. In general, the catalysts associated with the anode reaction are noble metal, e.g., platinum catalysts. These catalysts are usually an integral part of the anode but in some applications the catalysts are not a part of the anode. For example, the catalysts may be employed in the form of an electrolyte slurry. Because of the expensiveness of noble metal catalysts, continuing efforts have been made to find effective non-noble metal catalysts which are suitable for use as anodic oxidation catalysts in electrochemical cells.

In addition to exhibiting anodic oxidation catalytic activity, a material to be suitable for use as such a catalyst in an electrochemical cell must also exhibit certain other properties. For example, the material must be electrically conductive and, in addition, must be resistant to attack from the electrolyte within the cell. Many cells employ acidic electrolytes, since such electrolytes reject carbon dioxide, and thus the material which is conductive and catalytic must also be resistant to acid corrosion in order for the material to be a suitable anodic oxidation catalyst.

It has now been discovered that transition and post-transition metal mixed oxide tungsten bronzes are very effective anodic oxidation catalysts.

The term "transition and post transition metal" is used herein to represent any one of the members of Groups I-B, II-B, IV-B, V-B, VI-B, VII-B and VIII of the Periodic Table, provided that the term does not include any of the members, e.g., hafnium or tantalum, from the sixth row of said groups. The Periodic Table referred to is that described in supplement to Encyclopedia of Chemistry, Reinhold Publishing Company, 1958. Examples of transition and post-transition metals include titanium, vanadium, manganese, iron, zinc, and nickel.

The term "mixed oxide tungsten bronze" is used herein to represent the reaction products of transition or post-transition metals or the oxides of said metals with tungsten and/or tungsten oxide, the reactants having the stoichiometry $T_xWO_y$ where T is a transition metal or a post-transition metal, $x$ is between 0 and 1 and $y$ is between 2 and 4. The chemical structural formula of said reaction products is not known and X-ray analysis indicates no clear characterization of a single structural formula. The reaction products are electrically conducting and are intensely colored ranging from blue to gray, purple and black. The reaction products are acid resistant.

Examples of transition and post-transition metal mixed oxide tungsten bronzes include the reaction products of: nickelous oxide, tungsten metal and tungsten trioxide having the stoichiometric formula $Ni_{0.237}WO_3$; ferric oxide, tungsten and tungsten trioxide having a stoichiometric formula $Fe_{0.2}WO_3$; vanadium pentoxide, tungsten metal and tungsten trioxide having the stoichiometric formula $V_{0.2}WO_3$; zinc oxide, tungsten metal and tungsten trioxide having the stoichiometric formula $Zn_{0.2}WO_3$; titanium dioxide, tungsten and tungsten trioxide having the stoichiometric formula $Ti_{0.2}WO_3$; nickel and tungsten trioxide having the formula $Ni_{0.2}WO_3$; nickelic oxide, tungsten and tungsten trioxide having the formula $Ni_{0.237}WO_3$; manganese dioxide, tungsten and tungsten trioxide having the formula $Mn_{0.2}WO_3$.

The term "anodic oxidation catalysts" is employed herein to include catalysts which are associated with the anode reaction (as contrasted to the cathode reaction) of an electrochemical cell. As mentioned above, such catalysts may or may not be an integral part of the anode.

The catalysts of the present invention are prepared by reacting the transition or post-transition metal or the oxide of said metal with tungsten and/or tungsten oxide. The relative amount of each reactant which is used is dictated by the stoichiometric formula desired. The mixture is pressed into pellets and heated under high temperatures and vacuum for several hours. The pelletizing speeds the reaction by reducing the diffusion required. Suitable heating is between about 12 to 96 hours at temperatures between about 500–1400° C. After cooling, the pellets are powdered and X-ray analysis indicates the presence of tungsten oxides having the formulae $WO_3$, $WO_{2.96}$, $WO_{2.9}$, $WO_{2.72}$, and sometimes $WO_2$ ($WO_2$ is not acid stable) and sometimes a metal tungstate.

The catalytic powder may be fabricated, for example, into a catalytic anode by compressing the powder onto a conductive support material such as a metal screen with or without the use of a binder and/or wet-proofing agents such as Teflon.

The anodic oxidation catalysts of the present invention may be employed in electrochemical cells using acidic electrolytes such as sulfuric or phosphoric acids, buffer electrolytes such as aqueous or molten phosphates, borates, carbonates and the like. If used in alkali electrolytes, the catalysts are attacked after a comparatively short period of time.

The anodic oxidation catalyst of the present invention may be employed for the anodic oxidation of both electrolyte soluble and insoluble carbonaceous fuels such as ethane, ethylene, butane, decane and other saturated or unsaturated hydrocarbons, methanol, ethylene glycol, formaldehyde or oxygenated carbonaceous fuels. In addition, the catalysts are effective for hydrogen-containing fuels such as hydrogen, ammonia, hydrazine, and the like.

The present invention may be further illustrated by reference to the following examples which are included for illustrative purposes only and not intended to limit the scope of the invention in any respect.

EXAMPLE 1

Nickel mixed oxide tungsten bronze

Nickelous oxide, tungsten metal, and tungsten trioxide having the stoichiometric formula $Ni_{0.237}WO_3$ were mixed together and then pressed into pellets. The pellets were put into a quartz test tube evacuated on a vacuum pump and the tubes sealed under vacuum. The tube was then placed in a muffle oven and heated to 800° C. for 70 hours. After cooling, the tube was broken open and blue pellets were recovered. The blue pellets were powdered and passed through a 325 mesh screen. The catalystic powder was fabricated into an anode with a Teflon emulsion on a tantalum screen, by using 1 gram of catalyst, 0.2 cc. Teflon emulsion and a 50 mesh tantalum screen. The catalyst loading was 200 mg./cm.². The resulting catalytic anode was tested in a half cell employing 30 wt. percent aqueous sulfuric acid at a temperature at about 90° C., and nitrogen, hydrogen, ethylene and methanol as the fuel. The following data were obtained:

| Volts vs. Theoretical Hydrogen | Ma./5 cm.² Under $N_2$ | Ma./5 cm.² Under $H_2$ | Ma./5 cm.² Under Ethylene | Ma./5 cm.² Under Methanol |
|---|---|---|---|---|
| 0.14 | −1 | +0.9 | | |
| 0.34 | −1 | +1.9 | | |
| 0.94 | −0.05 | 4 | +.15 | 350 |

EXAMPLE 2

Iron mixed oxide tungsten bronze

Ferric oxide, tungsten, and tungsten trioxide having the stoichiometric formula $Fe_{0.2}WO_3$ were mixed together and then pressed into pellets. The pellets were put into a quartz test tube, evacuated on a vacuum pump and the tube sealed under vacuum. The tube was heated in a Leco tube furnace at 1800° F. for 24 hours. After cooling, the tube was broken open, yielding blue-purple color pellets. The pellets were powdered and passed through a 325 mesh screen. The powder was fabricated into a catalytic anode as in Example 1, using 1 gram of catalyst, 0.05 cc. Teflon 42 emulsion and a 50 mesh tantalum screen. The resulting catalytic anode was tested in a half cell employing 30% aqueous sulfuric acid at about 90° C. as the electrolyte. The following data were obtained:

| Volts vs. Theoretical Hydrogen | Ma./5 cm.² Under Nitrogen | Ma./5 cm.² Under Hydrogen |
|---|---|---|
| 0.4 | 0.1 | 6 |

EXAMPLE 3

Vanadium mixed oxide tungsten bronze

Vanadium pentoxide, tungsten metal and tungsten trioxide having the stoichiometric formula $V_{0.2}WO_3$ were mixed together and then pelletized into pellets. The pellets were put into a quartz test tube, evacuated on a vacuum pump and the tube sealed under vacuum. The tube was heated in a muffle furnace for about 72 hours at 800° C. After cooling, the tube was broken up yielding blue pellets. The pellets were powdered and passed through a 200 mesh screen. The powder was fabricated into a catalytic anode as in the previous examples. The resulting catalytic anode was tested in a half cell employing 30% aqueous sulfuric acid at about 90° C. as the electrolyte. The following data were obtained:

| Volts vs. Theoretical Hydrogen | Ma./5 cm.² Under Nitrogen | Ma./5 cm.² Under Hydrogen |
|---|---|---|
| 0.20 | −0.6 | +0.7 |
| 0.30 | 0.0 | +1.3 |
| 0.40 | 0.1 | 3.0 |

EXAMPLE 4

Zirconium mixed oxide tungsten bronze

A catalytic anode containing zirconium mixed oxide tungsten bronze was prepared and tested in substantially the same manner as the catalytic anodes of the previous examples. For this catalytic anode the following data were obtained:

| Volts vs. Theoretical Hydrogen | Ma./5 cm.² Under Nitrogen | Ma./5 cm.² Under Hydrogen |
|---|---|---|
| 0.94 | 0.12 | 0.22 |

EXAMPLE 5

Titanium mixed oxide tungsten bronze

A catalytic anode containing titanium mixed oxide tungsten bronze was prepared and tested in substantially the same manner as the catalytic anodes of the previous examples. For this catalytic anode the following data were obtained:

| Volts vs. Theoretical Hydrogen | Ma./5 cm.² Under Nitrogen | Ma./5 cm.² Under Hydrogen |
|---|---|---|
| 0.4 | −.05 | +.1 |
| 0.8 | 0.65 | 0.13 |

EXAMPLE 6

Manganese mixed oxide tungsten bronze

A catalytic anode containing manganese mixed oxide tungsten bronze was prepared and tested in substantially the same manner as the catalytic anodes of the previous examples. For this catalytic anode the following data were obtained:

| Volts vs. Theoretical Hydrogen | Ma./5 cm.² Under Nitrogen | Ma./5 cm.² Under Hydrogen |
|---|---|---|
| 0.6 | 0.05 | 0.20 |
| 0.94 | 0.20 | 0.40 |

EXAMPLE 7

Chromium mixed oxide tungsten bronze

A catalytic anode containing chromium mixed oxide tungsten bronze was prepared and tested in substantially the same manner as the catalytic anodes of the previous examples. For this catalytic anode the following data were obtained:

| Volts vs. Theoretical Hydrogen | Ma./5 cm.$^2$ Under Nitrogen | Ma./5 cm.$^2$ Under Hydrogen |
|---|---|---|
| 0.94 | 0.012 | 0.12 |

In one aspect of the present invention it has been discovered that to be an effective anodic oxidation catalyst nickel mixed oxide tungsten bronze must have a value of $x$ in the above formula of greater than 0.2 e.g. 0.237.

For example, when $x$ has a value of 0.2 in the nickel mixed oxide tungsten bronze, no activity is obtained when hydrogen is the fuel.

Some mixed oxide tungsten bronzes other than the transition metals or post-transition metal mixed oxide tungsten bronzes of the present invention do not exhibit the requisite properties of an anodic oxidation catalyst. For example, neither hafnium nor tantalum mixed oxide tungsten bronze exhibit anodic oxidation activity for hydrogen fuel.

As mentioned above, the transition metal and post-transition metal mixed oxide tungsten bronze anodic oxidation catalysts of the present invention may be fabricated in various manners to prepare a catalytic anode. While the particular method of fabrication will to some degree affect the performance of a catalytic anode, that aspect of the present invention which is concerned with catalytic anodes is not limited to any particular method of anode fabrication. In addition, it is possible that some of the catalysts will exhibit greater or lesser anodic oxidation activities than others with respect to different fuels. However, the present invention is not to be limited in this respect. Many modifications of the present disclosure will be obvious to those skilled in the art. It is intended that the spirit of the present invention be limited only to the following claims.

What is claimed is:

1. In combination with an electrochemical cell which includes an anode, a cathode, and an electrolyte positioned between and communicating with said anode and cathode, the improvement which comprises an oxidation catalyst for said anode wherein said catalyst is a metal mixed oxide tungsten bronze having the stoichiometric formula of $T_xWO_y$ where T is a metal selected from the group consisting of titanium, vanadium, manganese, iron, zinc, and nickel; $x$ is between 0 and 1 and $y$ is between 2 and 4.

2. In combination with an electrochemical cell as defined in claim 1, the improvement wherein said metal is zinc.

3. In combination with an electrochemical cell as defined by claim 2, the improvement wherein said metal is titanium.

4. In combination with a fuel cell having an anode, a cathode, an electrolyte positioned between and communicating with said anode and cathode, means for supplying a fuel to said anode, and means for supplying an oxidant to said cathode, the improvement which comprises a nonnoble metal electrocatalyst for oxidation at said anode wherein said electrocatalyst is a metal mixed oxide tungsten bronze having the stoichiometric formula of $T_xWO_y$ wherein T is a metal selected from the group consisting of titanium, vanadium, manganese, iron, zinc, and nickel; $x$ is between 0 and 1 and $y$ is between 2 and 4.

References Cited

UNITED STATES PATENTS

| 3,174,822 | 3/1965 | Borchardt | 23—51 X |
| 3,112,992 | 12/1963 | Bither | 23—51 |
| 3,207,573 | 9/1965 | Borchardt | 23—51 |
| 3,284,332 | 11/1966 | Gladrow et al. | |
| 3,367,802 | 2/1968 | Rhodes | 136—120 |
| 3,393,100 | 7/1968 | Niedrach | 136—86 |
| 3,146,131 | 8/1964 | Linden et al. | 136—86 |

OTHER REFERENCES

"Nonstoichiometric Compounds," Advances in Chemistry Series, No. 39, American Chemical Society, chapter 21, pp. 224–231.

ALLEN B. CURTIS, Primary Examiner

U.S. Cl. X.R.

23—51; 136—120